July 8, 1924. 1,500,247

F. P. LEWIS

MEANS FOR TESTING VISION

Filed Aug. 17, 1922

Inventor
F. Park Lewis
by his Attorneys
Weed & Gray

Patented July 8, 1924.

1,500,247

UNITED STATES PATENT OFFICE.

FRANCIS PARK LEWIS, OF BUFFALO, NEW YORK.

MEANS FOR TESTING VISION.

Application filed August 17, 1922. Serial No. 582,368.

*To all whom it may concern:*

Be it known that I, FRANCIS PARK LEWIS, a citizen of the United States, residing at Buffalo, in the county of Erie and State of New York, have invented certain new and useful Improvements in Means for Testing Vision, of which the following is a specification.

This invention relates to means or apparatus for testing vision, an object of this invention being to provide an improved mechanism for carrying out my principle for making objective visual tests, which may be accomplished through the adaptation by the patient or person to be examined of characters, symbols, lines or other objects of different values or degrees of thickness, size or length and which are to be matched or compared with lines of corresponding amplitude or value.

A further object of this invention is to provide an apparatus for testing vision by simultaneously comparing a symbol or character of predetermined value exposed to the eye with a symbol or character selected to have a corresponding or complementary value.

A further object of this invention is to provide an apparatus for determining vision which may comprise a pair of means having each a series of characters or symbols of different values or different amplitudes, and means for exposing to the eye a symbol of one means to match or aline with a predetermined symbol of the other means, said characters or symbols subtending predetermined visual angles according to a graduated scale, thereby permitting an accurate test of vision.

A further object of this invention is to provide an improved means for testing the sight whereby means is provided for exposing to the eye a character or the like, of certain value, and means is also provided for alining with said character a corresponding one selected by the patient, the alined characters adapted to be shifted into various angular relations so as to determine the axis of astigmatism.

Figure 1:
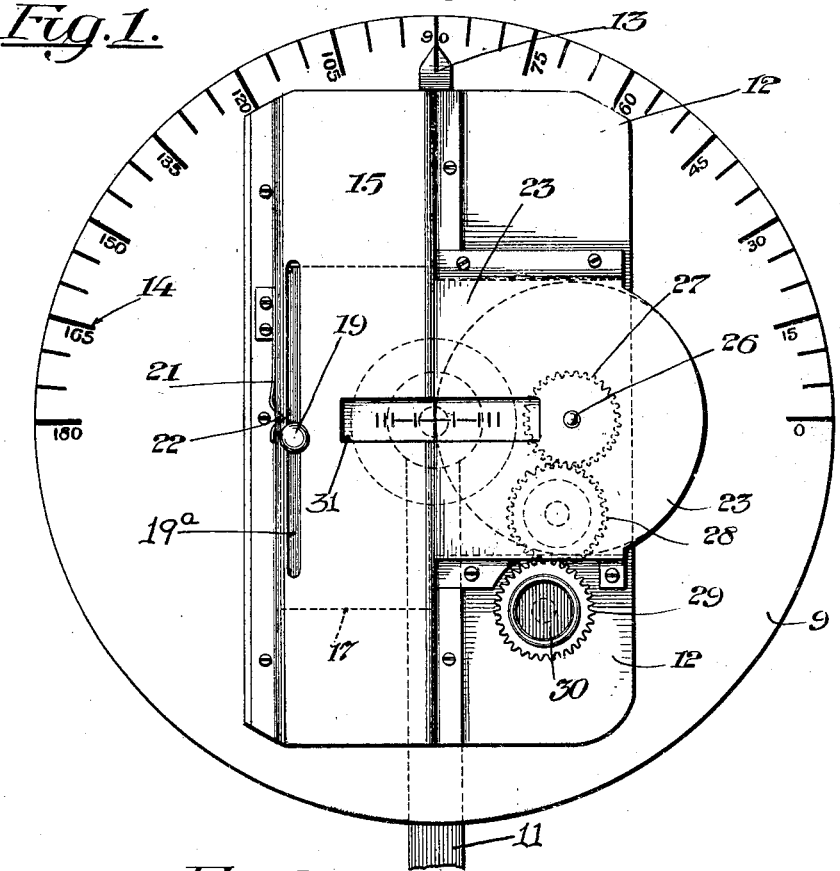
Figure 2:
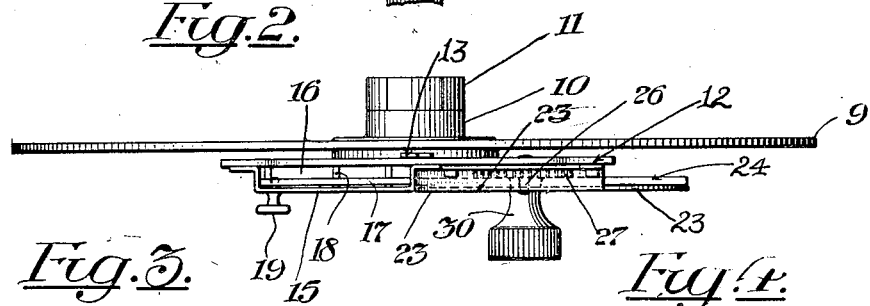
Figure 3:
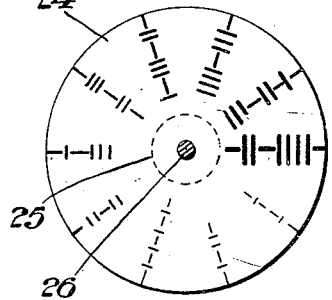
Figure 4:
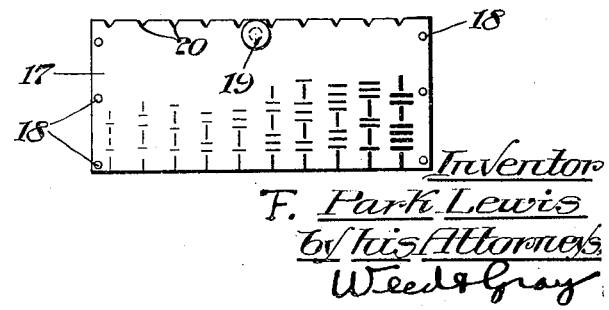

Other objects of this invention will appear in the following description thereof, reference being had to the accompanying drawing forming a part of this specification wherein like reference characters indicate corresponding parts in the several views and wherein Fig. 1 is a front elevation illustrating my improved eye testing device; Fig. 2 is a top plan view thereof; Fig. 3 is a view of the rotatable character carrying disc; and Fig. 4 is a view of the character carrying slide.

Heretofore the method employed in making visual tests consisted in displaying to the eye of the person to be examined and at a predetermined distance a series of letters or forms each denoting an arbitrary fractional value, such as 20/20ths, 20/30ths, 20/40ths, etc., the patient naming the letters as they were successively displayed. Such a system has been found to be inaccurate as it has been impossible to obtain more than an approximate eye test or to accurately measure fine differences in vision. Furthermore it has been found impossible to determine accurately the limit of vision and to determine which of a series of characters of different amplitudes the patient distinguishes or sees with the greatest degree of clearness. These disadvantages have been overcome by virtue of the present invention wherein means is provided for determining the visual acuity by means of a graduated scale of characters or values located at a fixed distance from the eye and read in terms of the angle of vision rather than in fractional form. The visual tests are carried out by means of a pair of movable character carrying scales or members, characters of one scale being matched or alined with characters of the other scale selected by the patient. The mechanism is preferably hand controlled and may be operated in any suitable manner depending to some extent upon the distance at which the apparatus is located from the eye of the person to be examined.

Referring to the drawings wherein a preferred embodiment of the invention is illustrated, it will be seen that a suitable support 9 in the form of a fixed disc is provided. This supporting disc 9 has a rearwardly extending bearing support 10 to which is secured a post 11 for supporting the disc in rigid upright position. Mounted upon the support 9 is a plate 12 pivoted within the bearing 10 so as to permit the plate to be rotated about its axis relatively to the support 9. This revoluble supporting plate 12 is provided with a pointer 13 adapted to indicate angular degrees on the scale 14.

Suitably secured to the supporting plate 12 is a guide member 15 constructed to form a channel or guideway 16 for a character carrying slide 17. This slide member is provided at opposite ends thereof with guide or locating pins 18 for maintaining the position of the slide 17 as to depth within the channel 16. The guide plate 15 is provided with a slot 19ª through which projects a knob 19 secured to the slide 17 and adapted to be manipulated by the hand for shifting the slide in a vertical direction. It will be noted that the slide 17 is provided at a marginal side edge thereof with notches 20, and a spring 21 secured to the guide plate 15 is provided with a V-shaped projection 22 adapted to extend into any of the notches. By virtue of the spring therefore the slide 17 may be shifted in a step by step manner, the action of the spring tending to hold the slide in each successive position corresponding to a notch 20.

A housing plate 23 is suitably secured to the supporting member 12 and within the space formed by this plate and the supporting plate 12 is housed a rotatable character carrying disc 24 and mechanism for operating the same. This disc is pivoted by means of a pin 26 to the plates 12 and 23 and is provided at one side with a spacing washer 25 to which is secured a gear 27 also mounted on the pivot pin 26. A gear 28 is mounted upon the plate 12 and meshes with the gear 27, and a gear 29 carried by a knurled knob 30 mounted upon the supporting plate 12 meshes with the gear 28. Thus by turning the knob 30 the disc 24 will be rotated by means of the intermeshing gears.

It will be seen that the slide 17 is provided with a series of characters, symbols or lines of different amplitudes. Each of these characters subtends a predetermined angle of vision at a fixed or definite distance from the eye of the person to be examined. The characters represent a graduated scale of values, that is, the characters may be of such variations in size or amplitude as to subtend gradually increasing visual angles, which will be measured in minutes. Thus, for example, referring to Fig. 4, the largest character or symbol may subtend an angle of fifty minutes at a predetermined number of feet from the eye of the patient, this being the limit of vision, and the smallest character shown may subtend an angle of five minutes, which is the angle of vision for the normal eye. The intervening characters would subtend angles between five and fifty minutes. In the present instance, by way of example, the characters are shown at five minute intervals, but in practice the intervals may of course be smaller so as to more accurately define the correct angle of vision. The rotatable disc 24 is also provided with a graduated scale of characters or symbols corresponding in amplitude or value to the scale of characters of the slide 17. The device is so constructed that a single character of each scale 17 and 24 may be visible to the eye through a transverse opening or slot 31 in the plates 15 and 23.

Thus the characters of different degrees of thickness and length of the slide 17 may be successively exposed to the eye through the opening 31 and by rotating the disc 24 such characters will be matched with similar characters carried by the disc 24, which may be alined therewith as shown in Fig. 1. It will be understood that the scale of characters of either movable plane 17 and 24 may be successively exposed to the eye and the other plane thereupon shifted so as to aline or match with the exposed character one of similar or complementary amplitude. The smallest lines or characters of the two movable planes that can be matched and brought into perfect alinement will measure the acuity of vision.

Apparatus of this character is equally applicable to a near range of 14 to 30 inches or to 20 feet and beyond, as well as to all ranges therebetween. After predetermined characters as indicated in Fig. 1 are alined, which characters form at a fixed distance a definite angle of vision measured in minutes, the plate 12 may be rotated so as to shift the alined characters into various angular relations, and the angle of the axis of astigmatism may be determined by reference to the degree indicated by the pointer 13 on the scale 14.

Thus by virtue of this construction a test for the astigmatic eye may be accurately made. The apparatus may also be used for matching colors in determining color blindness and is particularly adaptable for testing the eyes of railway and marine employees where exactness in the determination of visual acuity is necessary. For instance the several characters carried by the disc 24 and slide 17 may indicate a graduated scale of color values instead of size values, and after a predetermined color value is exposed to the eye through the opening 31, the patient may be called upon to operate the disc 24 and select a character of similar value to match therewith. It will be further understood that the characters shown on the disc and slide may be in the form of half figures and by exposing on one scale a half figure the patient would be required to complete the figure by the other scale by approximating or juxtaposing the opposed half thereof.

It is to be understood that by describing in detail herein any particular form, structure, or arrangement, it is not intended to limit the invention beyond the terms of the several claims or the requirements of the prior art.

I claim as my invention:

1. Apparatus for testing vision comprising the combination of means for exposing to the eye a symbol or character subtending a predetermined visual angle at a fixed distance from the eye, and means for matching said symbol with a symbol or character subtending a corresponding visual angle.

2. Apparatus for testing vision comprising the combination of movable means for successively exposing to the eye symbols or characters subtending different visual angles at a fixed distance from the eye, and movable means for matching and alining with any one of said symbols a symbol or character subtending a corresponding visual angle.

3. The combination of a pair of means having each a series of characters or symbols of different amplitude, and means for operating said means and for exposing to the eye a symbol of one means to match a predetermined symbol of the other means.

4. The combination of a pair of means having each a series of characters or symbols subtending different visual angles according to a graduated scale, and hand operated means for operating said means and for exposing to the eye a symbol of one means to match a predetermined symbol of the other.

5. The combination of a pair of relatively movable members having each a series of characters of different dimensions so as to subtend different visual angles, means for moving one of said members relatively to the other, to display a character to the eye, and means for moving the other member to match said character.

6. The combination of a pair of relatively movable members each having a series of characters of different dimensions so as to subtend different visual angles, means for moving one of said members relatively to the other to display a character to the eye, and means for moving the other member relatively to the first member to bring a character into alinement with said displayed character.

7. The combination of a pair of relatively movable members having each a series of characters of different dimensions, means for moving one of said members relatively to the other to display a character to the eye, means for moving the other member relatively to the first member to bring a character into alinement with said displayed character, and means for moving both characters into various angular relations.

8. The combination of a pair of means having each a series of characters or symbols of different characteristics, means for operating said means and for exposing to the eye a symbol of one means to match a predetermined symbol of the other means, and means for moving said pair of means into various angular relations.

9. In an apparatus for testing vision the combination of a pair of means having each a series of characters of different sizes, means for shifting one of said means to expose a character thereof to the eye, and means for shifting said other means to expose a similar character to the eye.

10. In an apparatus for testing vision the combination of a support, a pair of means carried thereby and having each a series of characters of different characteristics, means for shifting one of said means to expose a character thereof to the eye, means for shifting said other means to expose a similar character to the eye, and means for shifting said pair of means into a plurality of angular positions with respect to the support.

11. The combination of a pair of relatively shiftable members having each a series of characters of different sizes, and means for operating the same to cause characters of each member to be successively visible to the eye.

12. The combination of a pair of movable means having each a series of characters subtending different visual angles from a given point, and means for so operating said pair of means that a predetermined character of one may be compared with any character of the other.

13. Apparatus for testing vision comprising the combination of a slide having a series of characters of different dimensions subtending different visual angles at a fixed distance from the eye, and a rotatable member having similar characters adapted to be matched therewith.

14. Apparatus for testing vision comprising the combination of a support, a slide member carried thereby having a series of characters of different dimensions, a rotatable member carried by said support and having a similar graduated scale of characters, means for simultaneously exposing a single character of each member to the eye, and means for operating said members.

15. The combination of a sliding scale and a rotating scale of eye testing characters, means for displaying a character of one scale to the eye, and means for matching therewith a character of the other scale.

16. The combination of a sliding scale and a rotating scale of eye testing characters, means for displaying a character of one scale to the eye, means for matching therewith a character of the other scale, and means for simultaneously swinging said scales into various angular positions.

17. The combination of a member having a circularly arranged series of graduations, a supporting member pivoted thereto and having a pointer, a pair of relatively shiftable means carried by said supporting plate and having each a series of eye-testing characters, said supporting member having means for covering said characters and having a window adapted to display a character of each of said means, means for shifting one of said means to display a character to the eye, and means for shifting said other means for displaying a character in proximity to said first character.

18. The combination of supporting means, a pair of relatively shiftable members carried thereby and having each a series of characters subtending different visual angles at a given distance from the eye, said supporting means covering said characters and having a window adapted to display a character of each of said members, and means for shifting said members thereby to expose to the eye through said window different characters of each series.

19. The combination of supporting means having a window formed therein, a pair of shiftable members having each a series of characters subtending different visual angles at a given distance from the eye, one of said members being pivoted to said supporting means for rotatable movement, means including gear mechanism for rotating said last member thereby to successively display characters in said window, and means for shifting the other member to successively display characters in said window.

Signed at Buffalo, N. Y., this 10 day of August, 1922.

F. PARK LEWIS.